United States Patent
Rivers et al.

(10) Patent No.: US 7,097,153 B2
(45) Date of Patent: Aug. 29, 2006

(54) LINE CLAMP AND METHOD

(75) Inventors: Paul Brent Rivers, Cullman, AL (US);
Frederick James Diggle, III, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 157 days.

(21) Appl. No.: 10/786,734

(22) Filed: Feb. 25, 2004

(65) Prior Publication Data
US 2005/0184280 A1    Aug. 25, 2005

(51) Int. Cl.
*B63B 35/03* (2006.01)

(52) U.S. Cl. ............................................. 254/134.3 FT
(58) Field of Classification Search ....... 254/134.3 FT, 254/134.3 R, 134.7; 24/136 R
See application file for complete search history.

(56) References Cited

U.S. PATENT DOCUMENTS

| | | | |
|---|---|---|---|
| 2,750,152 A | * | 6/1956 | Schinske ............ 254/134.3 FT |
| 4,939,821 A | * | 7/1990 | Frank, Jr. ................. 24/136 R |
| 5,050,273 A | | 9/1991 | Okura |
| 5,054,667 A | | 10/1991 | Levy et al. |
| 5,142,745 A | | 9/1992 | Setty et al. |
| 6,581,251 B1 | | 6/2003 | Malin |

OTHER PUBLICATIONS

Product Search Drop Hardware, Internet Catalog, viewed on Jun. 1, 2004, Senior Industries, cited at http://www.seniorindustries.com. Clamp Drop Wire SS, catalog, date unknown.
Durable PE Shuttlecock, Internet Catalog, viewed on Jun. 2, 2004, Nan Yun Sporting Goods Co., Ltd./Jex Trading Co., Ltd., cited at http://www.allproducts.com.

* cited by examiner

*Primary Examiner*—Robert C. Watson
(74) *Attorney, Agent, or Firm*—Lee & Hayes, PLLC

(57) ABSTRACT

An apparatus for retaining and pulling line through a raceway includes a line clamp and an attachment portion. The line clamp has a wedge fitted into a channel that is adapted to retain the line between the wedge and the channel. Further, the attachment portion is attached to the wedge and connects the line clamp to an end of a fish tape.

10 Claims, 4 Drawing Sheets

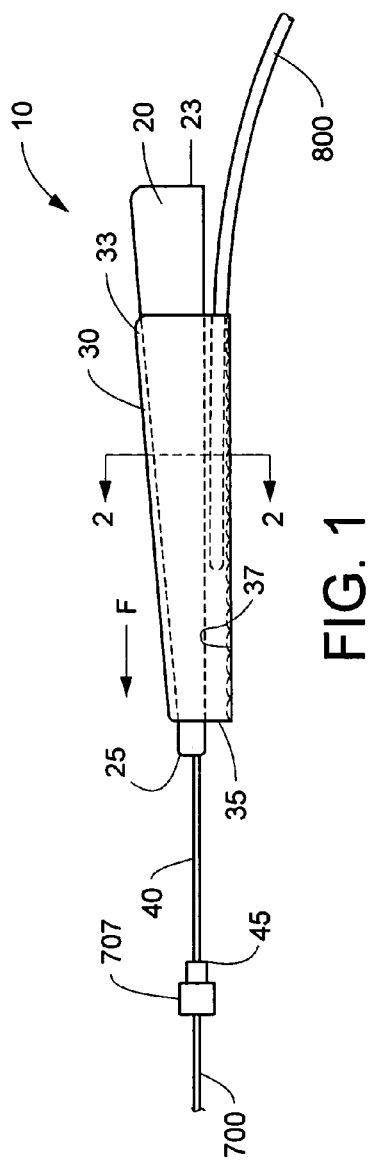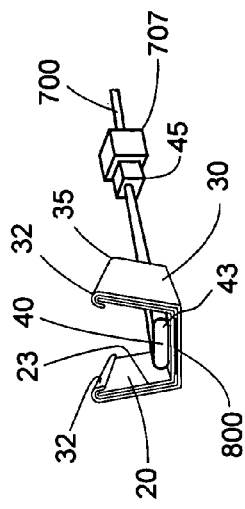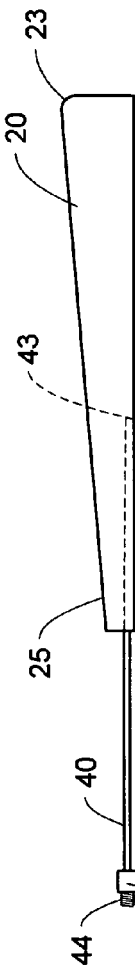

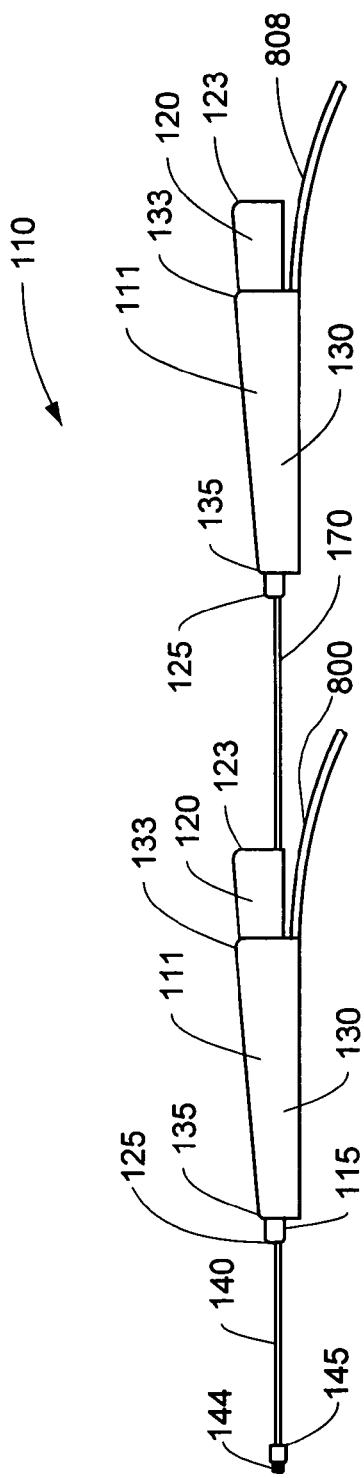
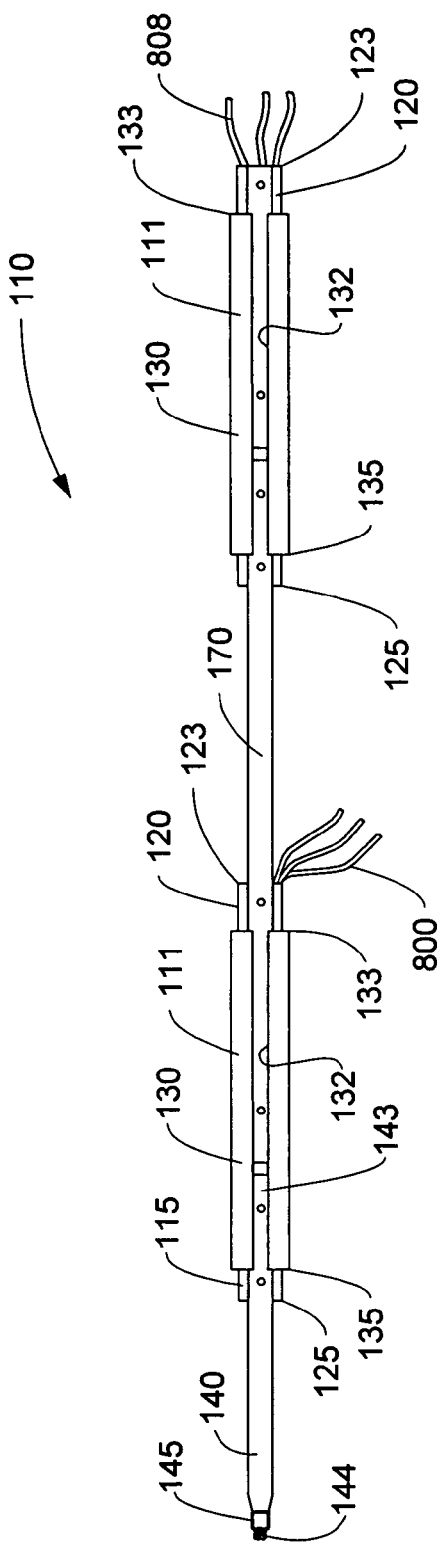
FIG. 5
FIG. 6

LINE CLAMP AND METHOD

BACKGROUND

The subject invention generally and in various embodiments relates to devices and methods for clamping one or more lines or wires.

Electricians and/or technicians are often required to install a run of one or more lines or wires (e.g., electrical or communication wire) through lengths of raceways. Raceways may include conduits, ducts and other enclosed channels. A fish tape is commonly sent through the raceway for installing the run of lines or wires. Often, a first line or wire is folded about a tab at an end of the fish tape and taped to itself on the other side where it is doubled over. Then, if necessary, additional lines or wires are taped flush along the first line or wire. The fish tape is then pulled back out of the raceway with the lines or wires attached, with the intent to install the line or wire with the fish tape being removed. This places a tremendous amount of tension on the first line or wire where additional lines or wire are attached. Often the raceway will have angled bends (e.g., 90 degree bends, etc.) and may already have runs of line or wire inside the raceway. With this tension of the first line or wire carrying the additional lines or wires and the possible obstacles, the first line or wire may often pull away from the tab of the fish tape. Further, it is sometimes a challenge to circumvent the obstacles and deviations in the raceway without having lines or wires pull away from the first line or wire due to the lack of strength in the flush securing of the additional lines or wires to the first line or wire.

In addition, a wire clamp is often used for retaining sections of drop wire being installed. The clamp is capable of attaching to a section of a length of drop wire and then attaching to a structure. A wedge wire clamp may be employed having a wire bail for connecting to the structure. In this manner, the portion of drop wire behind the clamped portion is relieved from the tension created from the hanging portion of drop wire on the opposite side of the clamp. The wire clamp often is used to retain a few wires temporarily while preventing damage to the installed wire.

SUMMARY

Various embodiments of the present invention include an apparatus for retaining and pulling line through a raceway. The apparatus has a line clamp and an attachment portion. The line clamp has a wedge fitted into a channel that is adapted to retain the line between the wedge and the channel. Further, the attachment portion is attached to the wedge and connects the line clamp to an end of a fish tape.

Various embodiments of the present invention also include an apparatus for retaining line. The apparatus has a plurality of interconnected line clamps, at least one flexible connector, and an attachment portion. Each interconnected line clamp has a wedge fitted into a channel and is adapted to retain the line between the wedge and the channel. The at least one flexible connector is positioned between individual line clamps and is attached to each wedge. An attachment portion also is positioned on an end of the plurality of interconnected line clamps.

Various embodiments of the present invention further include a method of pulling line through a raceway. The method includes attaching the line to a line clamp and attaching an attachment portion of the line clamp to an end of a fish tape. The method further includes pulling the fish tape through the raceway.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein:

FIG. 1 is a side view of a line pulling apparatus according to various embodiments of the present invention;

FIG. 2 is a cross-sectional view of the conduit support of FIG. 1 taken along the line 2—2;

FIG. 3 is a side view of a portion of the apparatus of FIG. 1;

FIG. 5 is a side view a line pulling apparatus according to various embodiments of the present invention;

FIG. 6 is a top view of the apparatus of FIG. 5;

DETAILED DESCRIPTION

Figure 4:
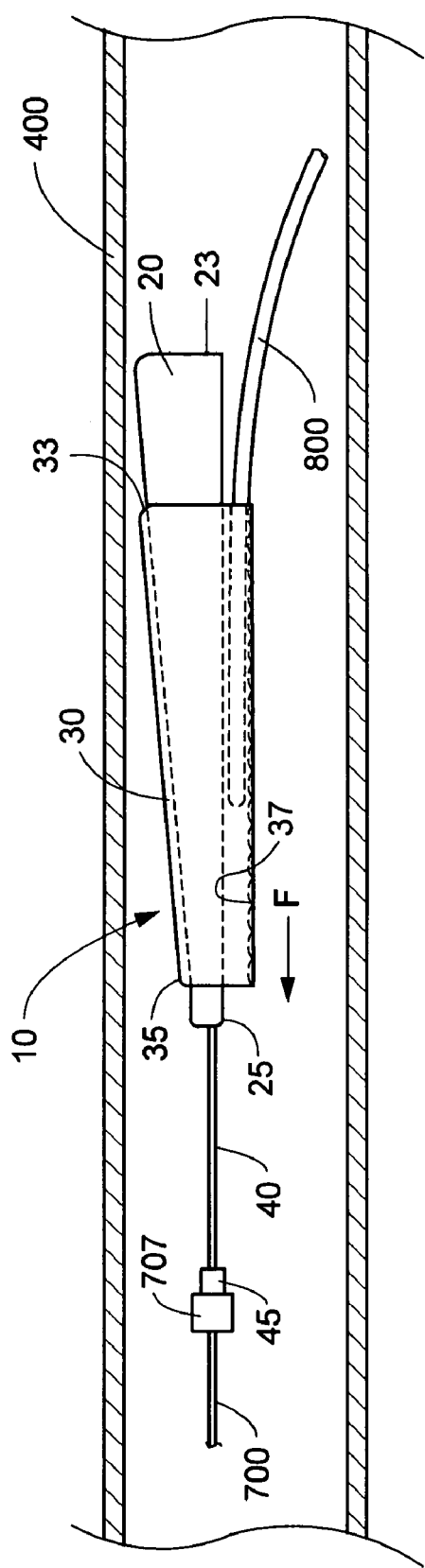
FIG. 4 is the apparatus of FIG. 1 positioned in a raceway shown in cross-section.
Figure 7:
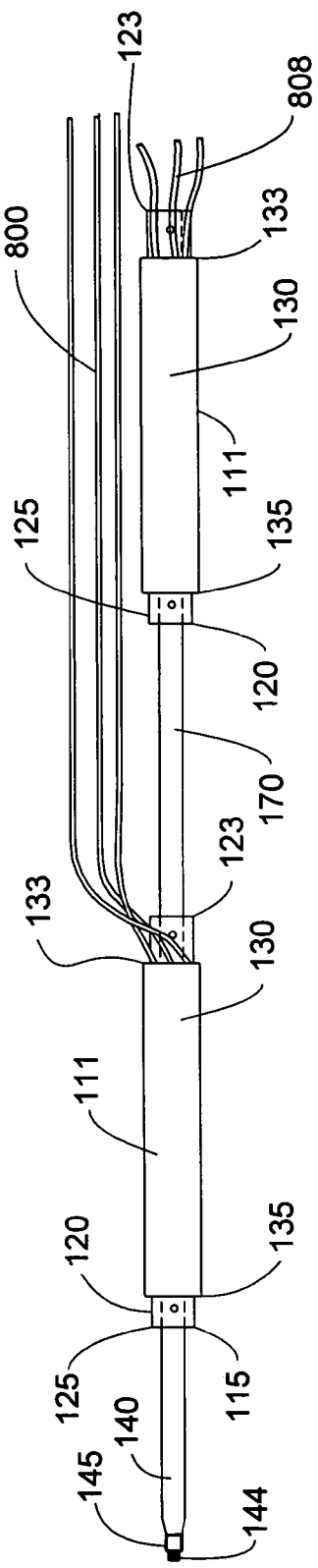
FIG. 7 is a bottom view of the apparatus of FIG. 5.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

FIGS. 1–4 depict various embodiments of a line clamp 10 that generally can be employed by a user, such as a technician (not shown) for example. The line clamp 10 can be used to retain and pull a line 800, or more than one line 800, through a raceway 900, as shown in FIG. 4. The raceway 900 may be, for example, a conduit, duct, enclosed channel, etc. The line clamp 10 has a wedge 20 and a channel 30. The wedge 20 is fitted into the channel 30 to retain the line 800 between the wedge 20 and channel 30. Further, an attachment portion 40 is attached to the wedge 20 and connects the line clamp 10 to an end portion 707 of a fish tape 700.

As can be seen in the drawings, the line clamp 10 is sized to fit within the raceway 900. Such a configuration allows the line 800 to be pulled through the conduit 900 as the line 800 is retained by the line clamp 10. The line clamp 10 also is sized to receive and retain the line 800. To retain the line 800, the line 800 is positioned in the bottom of the channel 30 as shown in FIGS. 1 and 2. As the channel 30 has a wide end 33 and a narrow end 35, the wide end 33 receives the line 800 between the wedge 20 and the channel 30. The wedge 20 is then placed over the line 800 and under the retaining tabs 32 of the channel 30. While the channel 30 is held stationary over the line 800, the wedge 20 is pulled in a forward direction "F" which causes the wedge 20 to clamp the line 800 between the wedge 20 and the channel 30. The further the wedge 20 is forced closer to the narrow end 35, the more secured the line 800 is to the line clamp 10. To further impress upon the line 800, protrusions 37 may be positioned in the bottom of the channel 30 to abut the line 800 as it is pressed against the wedge 20. Thus, the line 800 is retained by the line clamp 10.

In various embodiments, the line clamp 10 may include a shim (not shown) positioned between the wedge 20 and the channel 30. In the case where the line 800 is retained, the shim would be positioned between the wedge 20 and the line 800 to prevent damage to the line 800 such as, for example, scraping, chafing, etc.

FIG. 3 illustrates the wedge 20 disconnected from the channel 30 and the end 707 of the fish tape 700. As shown, the wedge 20 has a narrow end 25 and a wide end 23. The narrow end 25 of the wedge 20 is sized to fit within the narrow end 35 under the tabs 32 of the channel 30. See FIG. 2. Likewise, the wide end 23 is sized to fit within the wide end 33 under the tabs 32 of the channel 30. Thus, as the wedge 20 is inserted into the channel 30 under the tabs 32 in the forward direction F, the wedge 20 is increasingly friction fitted as the wide end 23 of the wedge 20 further advances against the tabs 32 toward the narrow end 35. In a similar manner, the further the wedge 20 is forced closer to the narrow end 35 while having the line 800 positioned between the wedge 20 and the channel 30, the more secured the line 800 becomes within the line clamp 10.

The line puller 10 is releasably attached to the end 707 of the fish tape 700 by attachment portion 40. As shown in FIG. 3, the attachment portion 40 includes a threaded connector 44. Other attachment portions (not shown) alternatively may be used including, but not limited to, hooks, loops, scissor hook, releasable clasp, etc., as the connection requirements may dictate for a given application. The threaded connector 44 is positioned at the end 45 of the threaded connector 44 and is further attached to the wedge 20 at an opposite end 43 to the wedge 20. The attachment portion 40 can be attached in several manners such as, for example, releasably or fixedly. Examples of attachment members may include, but are not limited to, set screws, rivets, spot welds, etc.

In various embodiments, the line clamp 10 may be constructed by material having a tensile strength that enables the line clamp 10 to pull one or more lines 800. Examples of such material include, but are not limited to, aluminum, stainless steel, other metals, plastic, etc.

In other embodiments, the line clamp 10 may include multiple line clamps 10. The multiple clamps 10 may be connected to one another by flexible connectors (not shown) attached between the wedges 20. Further, the flexible connectors also may be fixed to the wedge 20 by, for example, spot welding, rivets, etc. This configuration provides for more than one line 800 to be retained and pulled through the raceway 900. The flexible connectors may be made from material such as, for example, leather, nylon, composites, etc.

FIG. 4 depicts the line clamp 10 in the raceway 900 as it is pulled in the forward direction F. As shown, the line clamp 10 has the line 800 releasably attached between the channel 30 and the wedge 20. The line 800 is releasably attached to the line clamp 10 by positioning the line 800 between the channel 30 and the wedge 20 and pulling the wedge 20 in the forward direction F. In this manner, the line 800 can be secured to the line clamp 10 as the line clamp 10 is releasably attached to the end 707 of the fish tape 700 so that the line clamp 10 can pull the line 800 through the raceway 900.

FIGS. 5–8 depict various embodiments of a retaining apparatus 110 that generally can be employed by a user, such as a technician (not shown) for example. The retaining apparatus 110 can be used to retain lines 800, 808. As shown, the retaining apparatus 110 has a plurality of interconnected line clamps 111, at least one flexible connector 170 and an attachment portion 140. The line clamps 111 each have a wedge 120 and a channel 130 and further are connected to one another with the flexible connector 170 positioned between the line clamps 111 and attached to each wedge 120. The wedge 120 is fitted into the channel 130 to retain the lines 800, 808 between the wedge 120 and channel 130. Further, the attachment portion 140 is connected to the wedge 120 and positioned on an end 115 of the line clamps 111.

In various embodiments, each line clamp 111 is sized to receive and retain multiple bundles of lines 800, 808. To retain the lines 800, the ends of the lines 800 are positioned in the bottom of the channel 130 as shown in the drawings. As the channel 130 has a wide end 133 and a narrow end 135, the wide end 133 is adapted to receive the lines 800 between the wedge 120 and the channel 130. The wedge 120 is then placed over the lines 800 and under the retaining tabs 132 of the channel 130. See FIG. 6. While the channel 130 is held stationary over the lines 800, the wedge 120 is pulled in a forward direction "F" in which causes the wedge 120 to clamp the lines 800 between the wedge 120 and the channel 130. The further the wedge 120 is forced closer to the narrow end 135, the more secured the line 800 is to the line clamp 111. To further impress upon the lines 800, protrusions (not shown) may be positioned in the bottom of the channel 130 to abut the lines 800 as it is pressed against the wedge 120. Thus, the lines 800 are retained by the line clamp 111 and lines 808 are additionally retained in a similar manner to that described above for lines 800.

In various embodiments, the line clamp 111 may include a shim (not shown) positioned between the wedge 120 and the channel 130. In the case where the lines 800 were being retained, the shim would be positioned between the wedge 120 and the lines 800 to prevent damage to the lines 800 that may include, for example, scraping, chafing, etc.

FIGS. 5–8 illustrate the wedges 120 having a narrow end 125 and a wide end 123. The narrow end 125 of the wedges 120 is sized to fit within the narrow end 135 under the tabs 132 of the channel 130. Likewise, the wide end 123 is sized to fit within the wide end 133 under the tabs 132 of the channel 130. Thus, as the wedge 120 is inserted into the channel 130 under the tabs 132 in the forward direction F, the wedge 120 is increasingly friction fitted as the wide end 123 of the wedge 120 further advances against the tabs 132 toward the narrow end 135. In a similar manner, the further the wedge 120 in forced closer to the narrow end 135 while having the lines 800 positioned between the wedge 120 and the channel 130, the further secured the lines 800 become within the line clamp 111.

Figure 8:
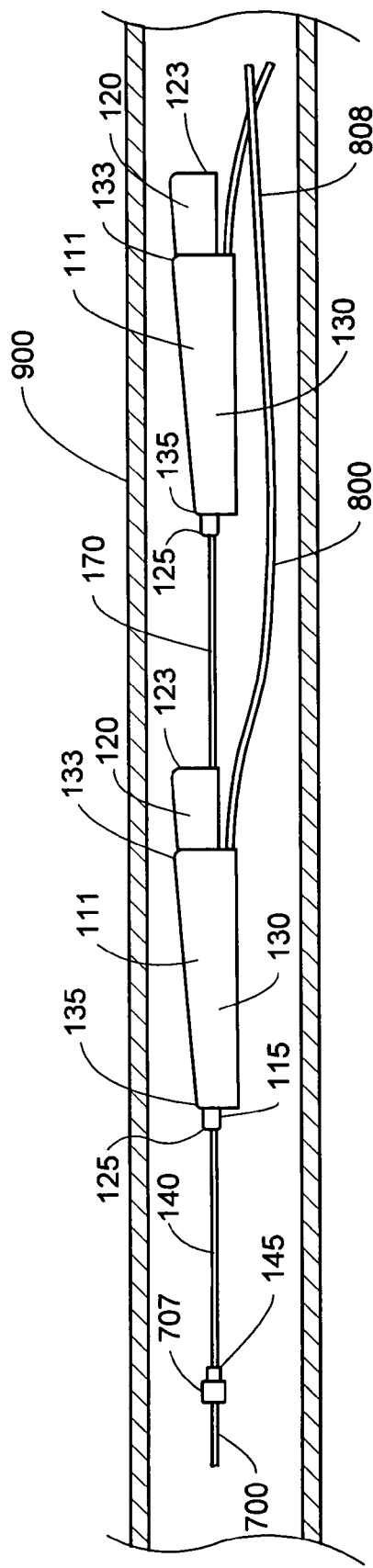
FIG. 8 is the apparatus of FIG. 5 positioned in a raceway shown in cross-section.

As shown in FIG. 8, the line puller 110 is releasably attached to the end 707 of the fish tape 700 by attachment portion 140. The line clamps 111 are sized to fit within the raceway 900. Such a configuration allows the line 800 to be pulled through the conduit 900 as the lines 800, 808 are retained by the line clamps 111. As shown, the attachment portion 140 includes a threaded connector 144. Other attachment portions (not shown) alternatively may be used including, but not limited to, hooks, loops, scissor hook, releasable clasp, etc., as the connection requirements may dictate for a given application. The threaded connector 144 is positioned at the end 145 of the threaded connector 144 and is further attached to the wedge 120 at an opposite end 143 to the wedge 120. See FIG. 6. The attachment portion 140 can be attached in several manners such as, for example, releasably or fixedly. Examples of attachment members include, but are not limited to, set screws, rivets, spot welds, etc.

Alternatively, line clamps 111 may be sized for common use in retaining multiple lengths of drop wire (not shown) for attachment to a structure (not shown). This is made possible by the line clamps 111 having the flexible connector 170 connecting the line clamps 111 together in such a way that each wedge 130 is biased toward the forward direction F when attached to a structure and retaining lines 800, 808. In such an application, the attachment portion 140 may be, for example, a hook, loop, releasable clasp, etc.

In various embodiments, the line clamp 111 may be constructed by material having a tensile strength that enables the line clamp 111 to pull at least lines 800, 808. Examples of such material include, but are not limited to, aluminum, stainless steel, other metals, plastic, etc. Further, the line clamps 111 may include additional line clamps (not shown). The additional line clamps may be connected to one another by additional flexible connectors (not shown) attached between individual wedges 120. Further, the additional flexible connectors also may be fixed to the wedge 120 by, for example, spot welding, rivets, etc. This configuration may provide for additional lines to be retained by the retaining apparatus 110. The flexible connectors 170 also may be made from material such as, for example, leather, nylon, composites, etc.

FIG. 8 depicts the line clamps 111 in the raceway 900 as it is pulled in the forward direction F. As shown, the line clamps 111 have the lines 800, 808 releasably attached between the channels 130 and the wedges 120. The lines 800, 808 are releasably attached to the line clamps 111 by positioning the lines 800, 808 between the channels 130 and the wedges 120 and pulling the wedges 120 in the forward direction F. In this manner, the lines 800, 808 can be secured to the line clamps 111 as the line clamps 111 are releasably attached to the end 707 of the fish tape 700 so that the line clamps 111 can pull the line 800 through the raceway 900.

As shown in the drawings, the line clamp has been depicted as having a generally U-shaped wedge and channel. As well, in one embodiment the raceway is cylindrical. The wedge and channel may be configured in a variety of shapes such that the line clamp is able to retain the line and fit within the raceway. Other shapes and configurations of raceways may include, but are not limited to ducts, enclosed channels, etc., and other shapes and configurations of line clamps may include, but are not limited to frustoconical shapes, etc. Thus, the line clamp may be configured to permit the line clamp to pass through the raceway for which the line clamp is shaped to fit within.

In various embodiments, the wedge may be of a solid construction configured to fit within the channel having the attachment portion attached. Further, the wedge alternatively may be of a solid construction that is partitioned in half. Such a configuration may provide that the attachment portion would be pressed in place between the two halves of the wedge while being secured to the wedge. In a similar fashion, the flexible connector may be positioned between the two halves of the wedge while being secured to the wedge.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus for retaining and pulling an end of a line though a raceway, the apparatus comprising:
    a line clamp having a wedge fitted into a channel adapted to retain the end of the line therebetween;
    an attachment portion attached to the wedge for connecting the line clamp to an end of a fish tape for pulling the line clamp through the raceway; and
    wherein the wedge retains the end of the line against the channel with an initial wedge pressure and wherein the initial wedge pressure is subsequently amplified by a leverage factor of the wedge on the point where the line ends in proportion to a pressure exerted to pull the line clamp though the raceway and at least in part in a direction of the pressure exerted to pull the line clamp through the raceway.

2. The apparatus of claim 1, wherein the line clamp further comprises a shim positioned between the wedge and the channel.

3. The apparatus of claim 1, wherein the line clamp is sized to fit within the raceway.

4. The apparatus of claim 1, wherein multiple line clamps are connected to one another by flexible connectors attached between the wedges.

5. The apparatus of claim 1, wherein the flexible connectors are fixed to each wedge.

6. The apparatus of claim 1, wherein the line clamp is sized to receive and retain the line.

7. The apparatus of claim 1, wherein the channel has a narrow end and a wide end, the wide end receiving the line.

8. The apparatus of claim 7, wherein the line clamp further secures the line as the wedge is forced closer to the narrow end.

9. The apparatus of claim 1, wherein the all attachment portion comprises a threaded connector having threads positioned at an end of the threaded connector and attached at an opposite end of the threaded connector to the wedge.

10. The apparatus of claim 1, wherein the line clamp is sized to fit within the raceway and the diameter of the raceway is about the same as the diameter of the line clamp.

* * * * *